(12) United States Patent
Herrington et al.

(10) Patent No.: US 9,937,984 B2
(45) Date of Patent: Apr. 10, 2018

(54) WAKE CONTROL FIN SYSTEM AND UNDERWATER EXHAUST SYSTEM

(71) Applicants: Frederick Herrington, Merritt Island, FL (US); Adam Shook, Merritt Island, FL (US); Thomas John "TJ" O'Grady, Merritt Island, FL (US); Thomas O'Grady, Merritt Island, FL (US)

(72) Inventors: Frederick Herrington, Merritt Island, FL (US); Adam Shook, Merritt Island, FL (US); Thomas John "TJ" O'Grady, Merritt Island, FL (US); Thomas O'Grady, Merritt Island, FL (US)

(73) Assignee: BRUNSWICK CORPORATION, Lake Forest, IL (US)

( * ) Notice: Subject to any disclaimer, the term of this patent is extended or adjusted under 35 U.S.C. 154(b) by 0 days.

(21) Appl. No.: 15/170,809

(22) Filed: Jun. 1, 2016

(65) Prior Publication Data
US 2017/0349247 A1    Dec. 7, 2017

(51) Int. Cl.
| | | |
|---|---|---|
| *B63H 25/42* | (2006.01) | |
| *B63B 39/06* | (2006.01) | |
| *B63B 1/32* | (2006.01) | |
| *B63B 35/85* | (2006.01) | |
| *B63H 25/38* | (2006.01) | |
| *B63H 21/32* | (2006.01) | |

(52) U.S. Cl.
CPC .............. *B63B 39/061* (2013.01); *B63B 1/32* (2013.01); *B63B 35/85* (2013.01); *B63H 21/32* (2013.01); *B63H 25/38* (2013.01); *B63B 2035/855* (2013.01)

(58) Field of Classification Search
CPC ...... B63H 21/32; B63B 39/061; B63B 35/731
USPC ................. 114/285, 127, 140; 440/89 F
See application file for complete search history.

(56) References Cited

U.S. PATENT DOCUMENTS

| | | | | |
|---|---|---|---|---|
| 2,860,594 A | | 11/1958 | Kiekhaefer | |
| 3,595,190 A | * | 7/1971 | Lapworth | .............. B63H 25/38 |
| | | | | 114/140 |
| 4,352,666 A | | 10/1982 | McGowan | |
| 4,493,665 A | * | 1/1985 | Liddle | ................. B63B 35/7926 |
| | | | | 114/127 |
| 4,708,672 A | | 11/1987 | Bentz et al. | |
| 4,789,368 A | * | 12/1988 | D'Onofrio | .......... B63B 35/7933 |
| | | | | 114/140 |

(Continued)

*Primary Examiner* — Stephen P Avila
(74) *Attorney, Agent, or Firm* — Malin Haley DiMaggio & Bowen, P.A.

(57) ABSTRACT

A wake control system aft of the driveshaft, propeller, and rudder of a vessel includes a fin base and at least one fin slidingly engaged with the fin base. The fin(s) are vertically oriented and extend down into the water surface. The fins are transversely adjustable along the fin base to redirect a wake generated by the boat. In other embodiments, the control system comprises a starboard fin tab adjacent to a port fin tab, each of the independent fin tabs hingeably attached to the aft section of the hull, at the transom. Each fin tab includes at least one extending fin. Fin tabs are selectively deployable and retractable into and out of the water surface to redirect a wake generated by the vessel from one side to the other. A novel underwater exhaust system redirects exhaust depending on speed of the vessel and complements the wake control system.

19 Claims, 12 Drawing Sheets

(56) References Cited

U.S. PATENT DOCUMENTS

| | | | |
|---|---|---|---|
| 4,936,243 A * | 6/1990 | Shields | B63H 25/38 |
| | | | 114/127 |
| 4,995,840 A | 2/1991 | Seale et al. | |
| 6,874,441 B2 | 4/2005 | Pigeon | |
| 7,434,531 B1 * | 10/2008 | Zsido | B63B 35/85 |
| | | | 114/284 |
| 8,246,403 B2 * | 8/2012 | Woods | F01N 1/088 |
| | | | 440/89 F |
| 8,534,214 B1 | 9/2013 | Gasper | |

* cited by examiner

WAKE CONTROL FIN SYSTEM AND UNDERWATER EXHAUST SYSTEM

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

1. Field of the Invention

The present invention generally relates to components for watercraft and more specifically to a wake control system for vessels used primarily for water sports, and a related underwater exhaust system.

2. Description of Related Art

Wakeboard or wake surfing is a popular water sport that combines water skiing, snowboarding, and surfing techniques. Typically, a rider utilizing a wake board is towed behind a motorboat or personal watercraft which generates a wake on which the rider can carry out various riding techniques including jumps, spins, flips, and other tricks. The power output and type of motorboat generally dictates the size and shape of the wake on which the rider rides. In most cases, a typical motorboat generates a wake that, due to various hydrodynamic forces, is only surfable or rideable on one side. In order to affect the wake, such as to move the rideable portion of the wake from one side to another, the motorboats often have a variable ballast system, which allows for water to be pumped into and out of the tanks in order to increase displacement to one side of the boat and move the surfable portion of the wake. Alternatively, some motorboats utilize drag hardware deployed at the sides of the vessel in order to switch the side on which a surface quality. However, experience has shown that these ballasts, hardware, and other means for redirecting the wake are cumbersome and often dangerous to the rider, boat operators, docks, swimmers, surrounding vessels, etc. Moreover, the use of devices that deploy beyond the hull on each side creates a great deal of drag rendering the vessel difficult to steer. Accordingly, there is a need in the art for an improved manner and means of alternating the wake generated by the a motorboat in order to enhance rideability.

Several attempts have been made at addressing the common issues with wake generation, however none have adequately solved the problem in a simple to operate, effective, and cohesive manner that avoids hardware that protrudes from the envelope of the vessel. For example, U.S. Pat. No. 8,534,214 to Gasper describes a system for modifying a boat's wake, which includes an aft rudder pivotally mounted to the watercraft for steering the watercraft, and one or two fins pivotally mounted to the watercraft substantially along its centerline and forward the rudder in a central position of the hull. The fin(s) pivots about an upright axis to modify the wake produced by the watercraft, and an actuator mounted within the boat and operably coupled to the fin(s) allows for pivoting the fin relative to the centerline. An operator controlled actuator selectively pivots the fin to a desired angle relative to the centerline.

U.S. Pat. No. 7,424,531 to Zsido describes a controlling device which includes at least first and second trim tab-like plates having a bottom surface which is convexly curved between their forward and rear ends, and are mounted to the port and starboard sides of the boat transom. The forward ends of the plates pivot upwardly and downwardly similar to a conventional trim tab. Actuator controls adjustably pivot the plates relative to the mounts. A plurality of small generally triangular fins extend from the plates at substantially right angles to the plate bottom surfaces and extend at substantially right angles from the axes, for the purpose of facilitating advantageous flow performance of the plate through the water. Side plates are on the lateral edges of the first and second plates.

U.S. Pat. No. 4,708,672 to Bentz illustrates a boat stabilizer for eliminating "porpoising", the up and down movement of the bow as the boat moves through water. The stabilizer includes a wedge-shaped member formed on an adjustably mounted trim tab located on the underside of the anti-cavitation plate of an outboard motor. The wedge-shaped member has a downwardly inclined lower surface extending laterally from and perpendicularly to a fin-shaped member of the trim tab. Movement of the boat through water imparts a force against the downwardly inclined surface to effect a generally vertical torque on the boat to eliminate porpoising in a given speed range. The force imparted is proportional to the angle of attack of the inclined surface, so that upward displacement of the bow is opposed by a proportionately greater force on the inclined surface. A number of stabilizers are provided with different angles of the downwardly inclined surface relative to the anti-cavitation plate for each stabilizer, so that an appropriate stabilizer can be selected for different boat/outboard motor combinations.

U.S. Pat. No. 4,352,666 to McGowen describes a conventional outboard motor comprising a rotatably mounted propeller, and a non-conventional "trim tab" mounted on the motor's cavitation plate for pivotal movement, and a linkage for rotating the assembly in response to movement of the propulsion unit. The device includes dual "trim tab elements or fins", which are vertical plates protruding downwardly from the cavitation plate.

It is, therefore, to the effective resolution of the aforementioned problems and shortcomings of the prior art that the present invention is directed. However, in view of the wake modifying devices for motorboats in existence at the time of the present inventions, it was not obvious to those persons of ordinary skill in the pertinent art as to how the identified needs could be fulfilled in an advantageous manner, nor to design a wake control device with the structural and functional features set forth herein.

SUMMARY OF THE INVENTION

The present invention contemplates various embodiments of a wake control system for marine vessels configured to redirect the wake generated by the powertrain of the vessel. In some embodiments, the wake control system is disposed aft of the driveshaft, propeller, and the rudder of the vessel and comprises at least one fin slidingly engaged with the hull of the vessel. The fin is vertically oriented and extends down into the water surface. The at least one fin is transversely adjustable across at least a portion of the hull in order to redirect a wake generated by said marine vessel. In some embodiments, the fin is slidingly engaged with a fin base that provides a track, guide, or other translation means. The at least one fin is disposed along the centerline of the hull at or near the aft section or transom of the vessel. In some embodiments, two fins are provided and may be separately or together adjustable along the fin base.

In an alternative embodiment, the control system comprises a starboard fin tab adjacent to a separate port fin tab, each of said fin tabs hingeably attached to the aft section of a hull of the vessel, generally about the centerline and the transom thereof. Each of the fin tabs includes at least one generally vertical fin extending therefrom. The fin tabs are each independently and selectively deployable and retractable into and out of the water surface in order to redirect a wake generated by the vessel from one side to the other.

Accordingly, it is an object of the present invention to provide an enhanced means and manner to redirect and adjust the rideable portion of a wake produced by a marine vessel or motorboat from one side to the other.

It is another object of the present invention to redirect the wake generated by a marine vessel or motorboat using hardware components that do not extend off the sides of the vessel in a manner that would interfere with or potentially come in contact with docks, swimmers, divers, riders, or other vessels.

It is yet another object of the present invention to provide an improved wake control fin system and underwater exhaust system which are cost effective and operationally efficient.

In accordance with these and other objects which will become apparent hereinafter, the instant invention will now be described with particular reference to the accompanying drawings.

DETAILED DESCRIPTION

Figure 1:
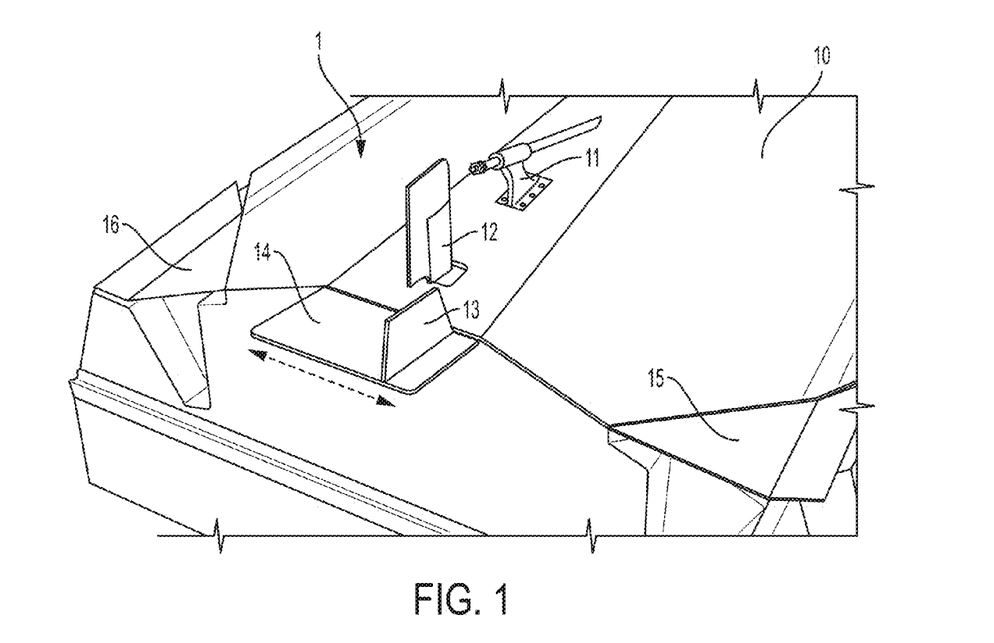
FIG. 1 is a perspective view of one embodiment of the wake control system employing one moveable fin.

With reference to FIG. 1, shown is one embodiment the wake control system 1 installed on the hull 10 of an exemplary vessel. Shown is a conventional drive shaft and strut 11 disposed forward of a conventional rudder 12. A propeller (shown hereinafter) would be mounted to the drive shaft as typical for an inboard motor vessel. Disposed aft of the rudder generally about the centerline of the hull 10 is a wake control fin 13. In some embodiments, the fin 13 is vertically oriented and extends away from the hull 10 (downward when the hull 10 is on water). Fin 13 is slidingly mounted to a fin base 14 that provides an engagement point for the adjustability of the fin 13. Accordingly, fin 13 is attached to the fin base 14 such that the fin can change positions and be adjusted transversely across the width of the hull 10. In some embodiments, the fin 13 is slidingly engaged with the fin base 14 by a translation means such as a track, guide, rail, or the like that may be manually or automatically controlled either mechanically, hydraulically or electronically. Fin base 14 and fin 13 are provided substantially at or near the aft area of the vessel and toward the bottom of the hull 10. In some embodiments, the system 1 includes separate port and starboard (bi-lateral) trim tabs 15 and 16 disposed at the lateral corners of the aft of the hull 10.

Figure 2:
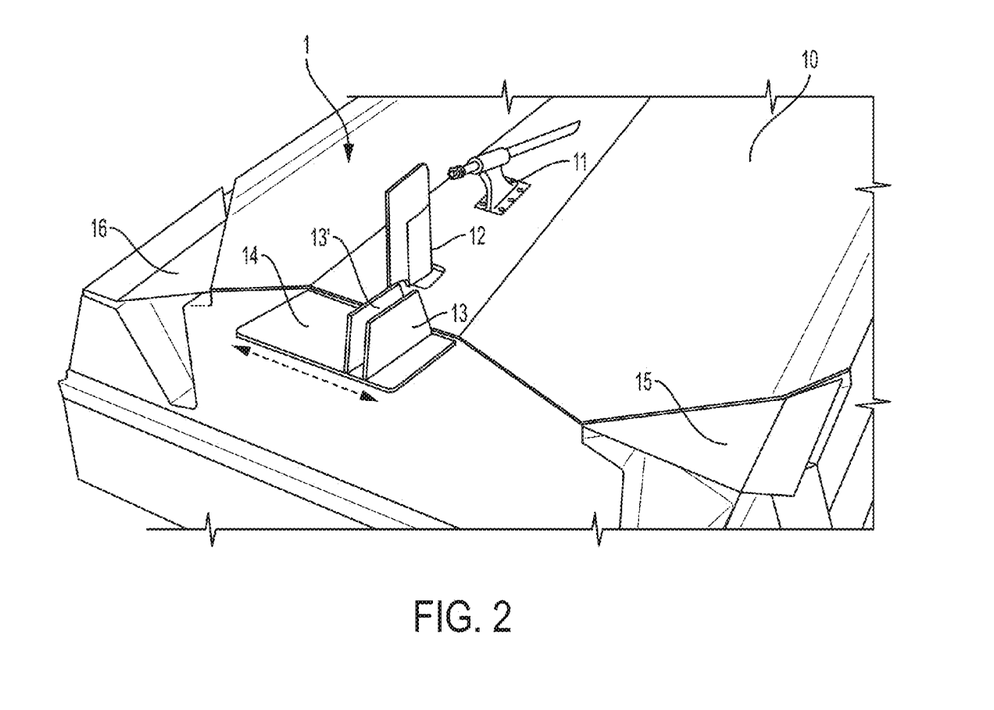
FIG. 2 is a perspective view of another embodiment of the wake control system employing two moveable fins.

With reference to FIG. 2, shown is another embodiment of the wake control system 1 installed on the hull 10 of an exemplary vessel. This embodiment incorporates twin fins 13 and 13' mounted to the fin base 14. Accordingly, shown is a conventional drive shaft and strut 11 disposed forward of a conventional rudder 12. Disposed aft of the rudder substantially about the centerline of the hull 10 are tandem wake control fins 13 and 13'. Fins 13 and 13' are slidingly mounted to a fin tab or base 14 that provides an engagement point for the adjustability of the fins 13 and 13'. Accordingly, fins 13 and 13' are attached to the fin base 14 such that the fins can be adjusted transversely across the width of the hull 10 in accordance with the directional arrows shown. In some embodiments, the fins 13 and 13' are slidingly engaged with the fin base 14 by a translation means such as a track, guide, rail, or the like that may be manually or automatically controlled either mechanically, hydraulically or electronically as stated above. The fins 13 and 13' may be configured to move together in tandem, or may alternatively be configured to move separately. Fin plate/base 14 and fin 13 are provided substantially at or near the aft section of the vessel and on the bottom of the hull 10. Alternatively, the system 1 includes port and starboard trim tabs 15 and 16 disposed at the lateral corners of the aft of the hull 10.

By deploying specially designed fin(s) 13 aft of the propeller and rudder, the system 1 redirects the forces imparted on the water by the propeller and steering gear. This allows the vessel to develop a wake on either side of the boat, depending on fin position. Unlike prior art systems, the system 1 herein requires no hardware that protrudes beyond the sides of the hull. Due to the ubiquitous swim platforms installed on this type of vessel, all the hardware needed for the system 1 is protected by the vessel's rub rails. As a result, the system 1 is less prone to receiving, or causing damage during normal use, as it is protected by the hull and swim platform of the vessel. The one or more vertically oriented fins 13 and/or 13' deployed aft of the transom are effective to deflect the propeller wash and hydrodynamic forces to create a surfable wave on one side of vessel. The position of this fin can be adjusted (or multiple fins used) to move the wake from one side of the vessel to another based on preference, conditions, specific maneuvers, competitions and/or performances. As noted above, in some embodiments, the position of the fin 13, or multiple fins 13 and 13', will be adjustable from the helm by way of electrical or hydraulic actuators or other control hardware. The transverse location of the deployed fin 13 and trim tab 15 and 16 angle of attack may be adjustable. Profile, size, and location of the hardware can vary to suit the parameters of the vessel to which it is attached. In select embodiments, the fin 13 or fins 13 and 13' will be located aft of the transom and under a swim platform, and will not protrude outboard of the hull sides.

The wake control system 1 uses the forces already being developed by the propeller and rudder, and redirects them to develop an optimal wake to either side of the vessel. This means that an end user will not have to move ballast, or pay a significant drag penalty (caused by surf gates, etc.) in order to have push button control of surfing conditions. It is also a more robust system since all hardware is aft or under the hull (rather than sticking out the sides) and covered by the swim platform or other hardware at the transom or aft of the vessel so that it will not strike docks, obstacles, or swimmers.

Figure 3:
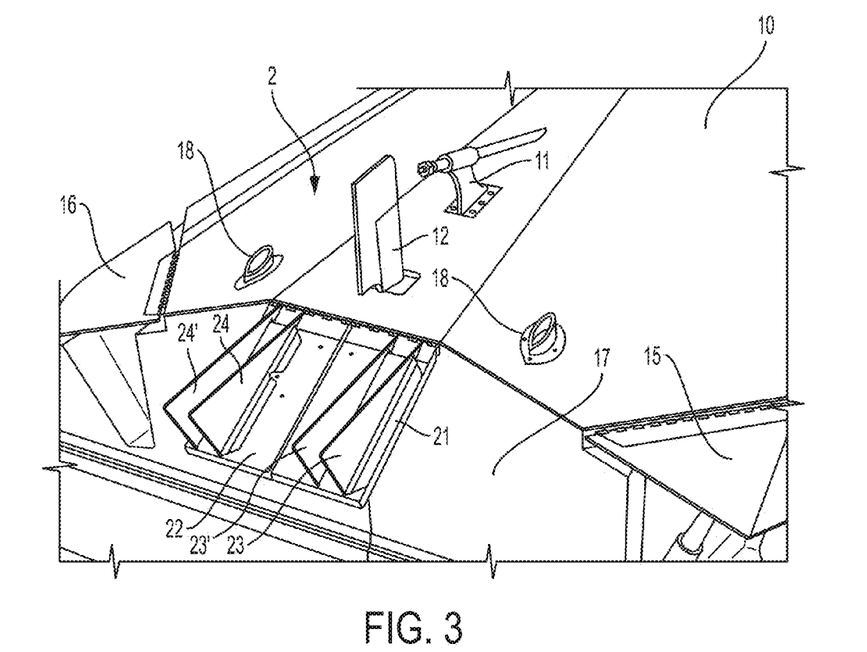
FIG. 3 is a perspective view of another embodiment of the wake control system employing a split system with independent fixed or adjustable fins.
Figure 4:
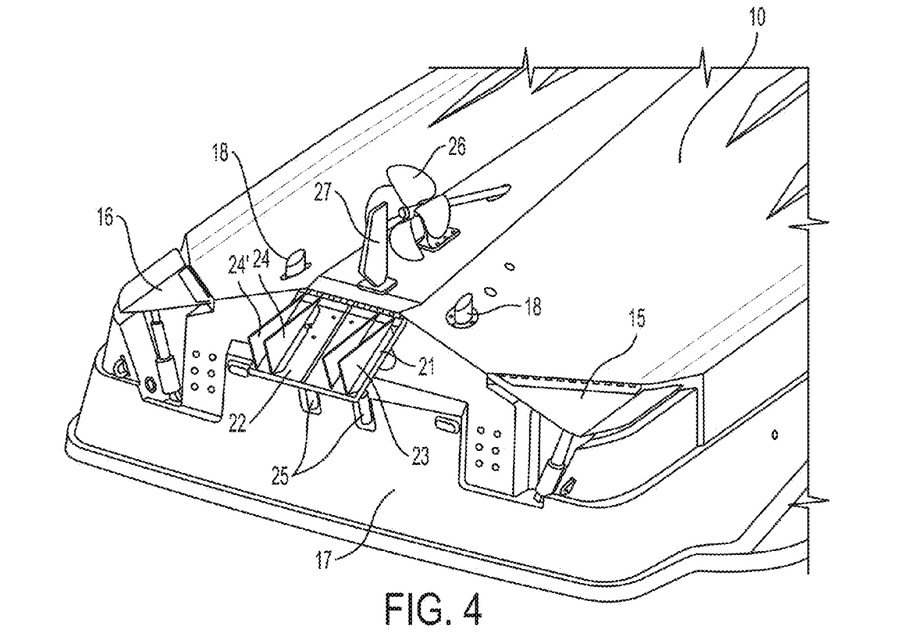
FIG. 4 is an alternative perspective view of another embodiment of the wake control system employing a split system with independent fixed or adjustable fins.

With reference to FIGS. 3 and 4, shown is alternative embodiments the inventions, in this case, wake control system 2 installed on the hull 10 of an exemplary vessel. This embodiment incorporates twin fin tabs, port fin tab 21 and starboard fin tab 22 hingeably mounted at the rear of the hull 10. Accordingly, shown is a conventional drive shaft and strut 11 disposed forward of a conventional rudder 12. Disposed aft of the rudder substantially about the centerline of the hull 10 are a pair of wake control fin tabs 21 and 22. Fins tabs are hingeably mounted to the bottom rear of the hull 10 such that the angle of the fin tabs can be adjusted up and down either manually, hydraulically, or electronically similar to conventional trim tabs. The fin base or tabs 21 and 22 are, in some embodiments, adjacent to each other and at substantially the same orientation with respect to the aft of the hull 10 so as to form a split centerline fin tab system. In some embodiments, each fin tab 21 and 22 is engaged with a hydraulic or electrical strut or actuator 25 attached between the top surface of the fin tab and the transom area 17 of the hull 10. Each fin tab 21 and 22 includes one or more fixed fins 23, 23' and/or 24, 24' extending therefrom. Optionally, the system 2 includes port and starboard trim tabs 15 and 16 disposed at the lateral corners of the aft of the hull 10. The fin tabs 21 and 22 are thus each discretely and selectively deployable and retractable, it being understood that in the deployed position the given fin tab will be directed toward and into the water, and away from the hull, and in the retracted position the given fin tab will be positioned upward toward the vessel. The fins 23, 23' and/or 24, 24' can be either fixed in place about the tabs base, or alternative can also be transversely adjustable to be repositioned in side-to-side fashion about the tab base and hull.

FIG. 4 illustrates an alternative perspective view of the instant inventive wake control system with propeller 26 attached to the drive shaft, and an alternatively designed rudder 27, many different types of which can be employed in the system. Also shown are exhaust system outlets 18, which will be further described in reference to the underwater exhaust system hereinafter.

Figure 5:
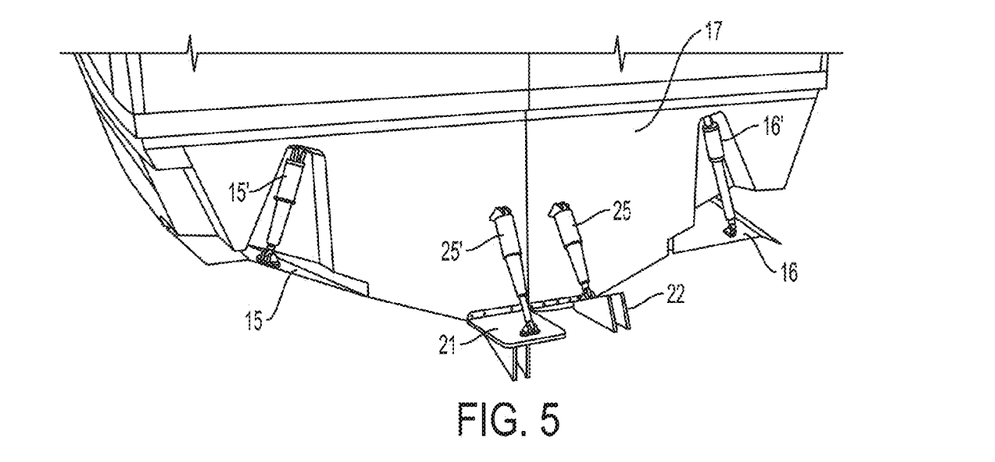
FIG. 5 is a perspective view of the system shown in FIG. 3 shown in port side-biased configuration.
Figure 6:
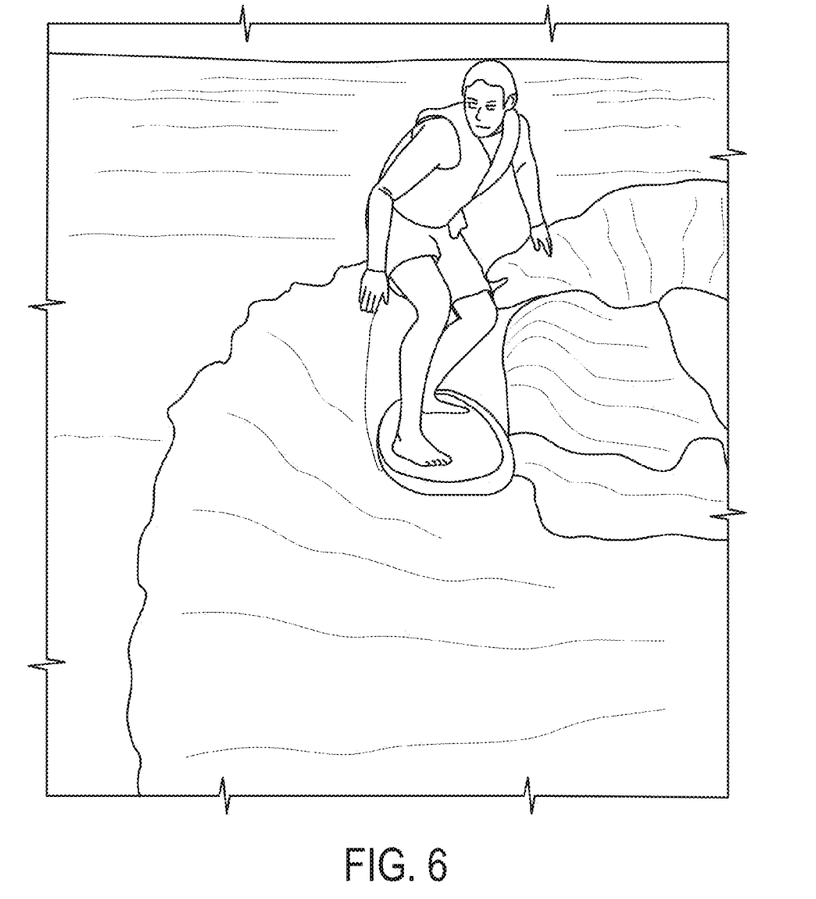
FIG. 6 is an example of a rider riding a wake on the port side.

FIG. 5 shows the split-fin tab system 2 in a port-side wake control configuration. As shown in FIGS. 5 & 6, a port side surfing wake can be created by deploying (extending) the port side fin tab 21 through actuator strut 25', and keeping the starboard side fin tab 22 in a retracted position. This will effectively bias the wake toward to the port side of the vessel. The trim tabs 15 and 16 can then be used to adjust the overall height and pitch of the face of the wake depending on the rider's ability level. FIG. 5 depicts starboard trim tab 16 being deployed by strut 16' to assist with wake control in conjunction with the fin tab 21, and FIG. 6 depicts a rider riding a port side wake generated by the system 2, and being continuously ridden by the surfer behind the boat.

Figure 7:
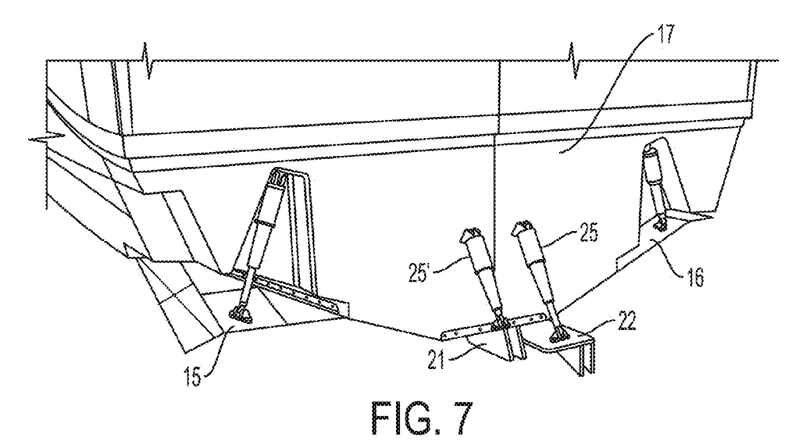
FIG. 7 is a perspective view of the system shown in FIG. 3 shown in starboard side-biased configuration.
Figure 8:
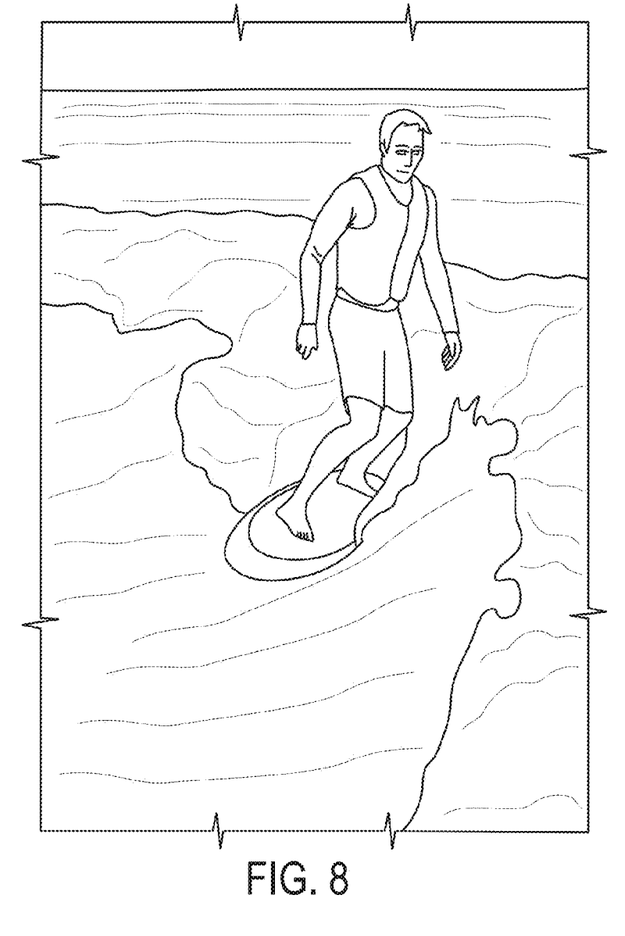
FIG. 8 is an example of a rider riding a wake on the starboard side.

Alternatively, with reference to FIGS. 7 & 8, the split-fin tab system 2 is in a starboard-side wake control configuration. Here, the port side fin tab 21 is retracted, and the starboard side fin tab 22 is deployed by strut 25. Again, the trim tabs 15 and 16 can be used to fine tune the height and pitch of the face of the wave through their struts 15' and 16'. FIG. 8 depicts the wake created on the starboard side and being ridden continuously by a surfer behind the boat.

Figure 9:
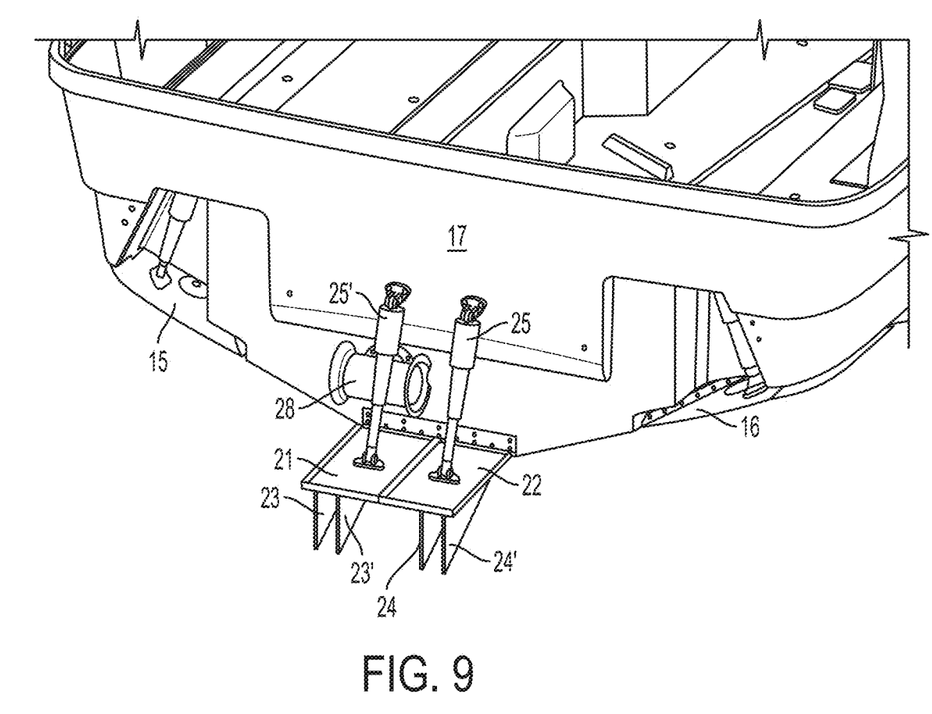
FIG. 9 is an alternative perspective view of another embodiment of the wake control system employing a split system with independent fixed fins pairs.

FIG. 9 depicts an alternative left side perspective view of the of the wake control system employing a split system with the independent fixed fin tab pairs 21, 22 and their associated vertical fins 23, 23' and 24, 24', along with struts 25' and 25. Also shown in this embodiment, the boat includes a stern thruster 28 for controlling the position of the rear of the boat through side-to-side movement.

Figure 10:
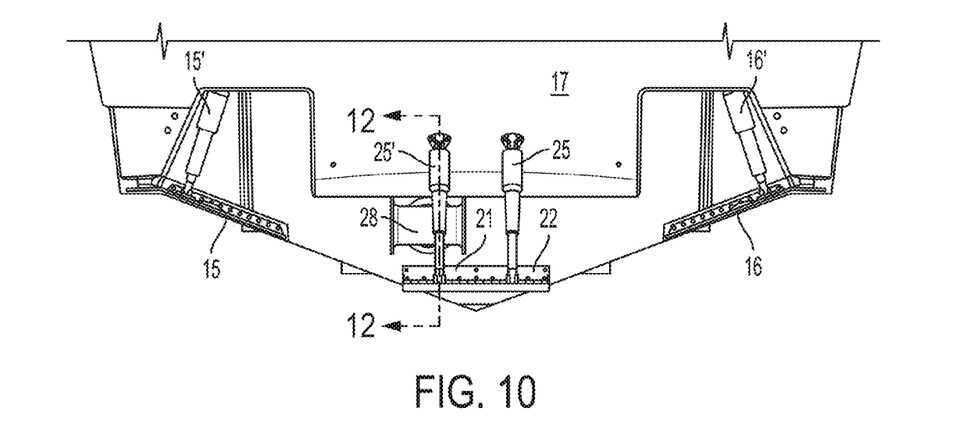
FIG. 10 is a rear view of the system shown in FIG. 9.
Figure 11:
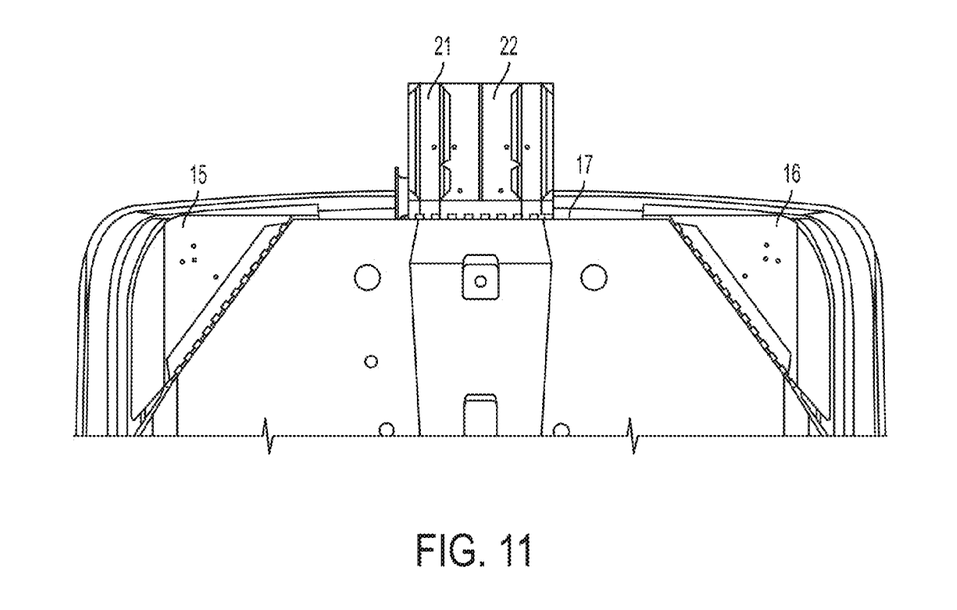
FIG. 11 is a bottom plan view of that shown in FIG. 10.

FIG. 10 is a rear transom view of the system and components shown in FIG. 9 (with vertical fins removed), and FIG. 11 is a bottom plan view of that shown in FIG. 10.

Figure 12:
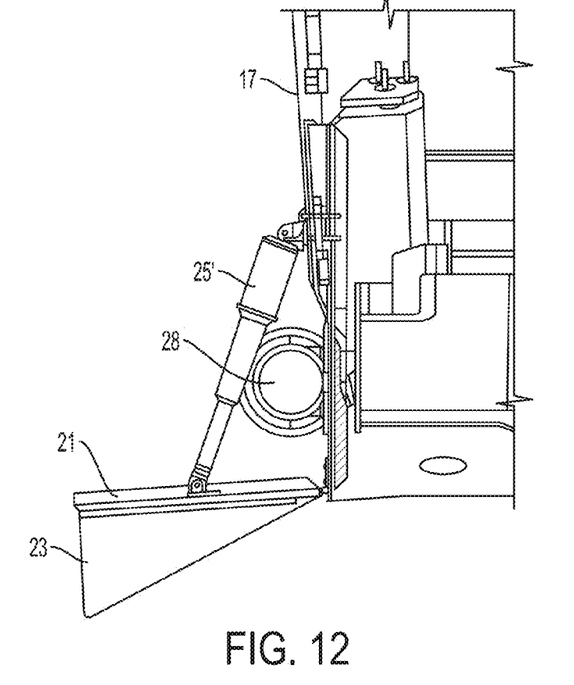
FIG. 12 is a cut-away side view taken along line 12/12 of FIG. 10.

FIG. 12 is a cut-away cross-sectional side view taken along line 12/12 of FIG. 10, illustrating thruster 28 mounted on transom 17, along with fin tab 21 and fin 23.

Figure 13:
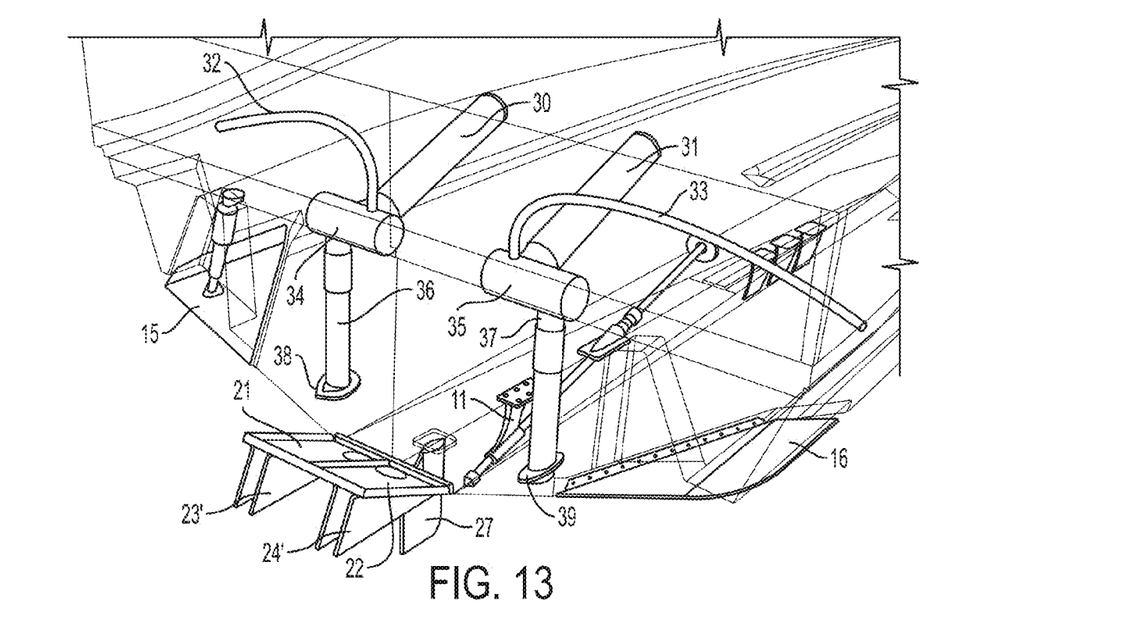
FIG. 13 is a partial perspective top plan view of the novel underwater exhaust system in conjunction with the wake control system.

FIG. 13 is a partial perspective top plan view of the novel underwater exhaust system in conjunction with the wake control system described above. This underwater exhaust system prevents exhaust fumes from reaching surfers behind the boat, and avoids conventional designs which employ transom mounted piping and related hardware which extend from and about the transom area creating additional hazards, risk of damages, and are also inefficient and expensive. The instant exhaust system routes exhaust gases through outlets on the bottom of the vessel, rather than the transom. This causes fumes and noise levels to be demonstratively reduced. This system is quiet and keeps the exhaust fumes away from end-users as they gauge and water sports such as wake surfing and wake boarding. The underwater exhaust system is directed through the hull bottom forward of the transom. As indicated, this directs engine exhaust fumes away from wake surfers and borders, and also eliminates the need for exhaust tubing or other systems on the exterior of the vessel. The design incorporates specially shaped exhaust outlets affixed to the bottom of the boat. The exhaust outlets require some forward movement to create a low pressure point at the outlet and pull exhaust out into the water. The design incorporates exhaust by-passes to eliminate burbling and splashing when the boat is not moving or is moving slowly. A small secondary exhaust line is taken off the main exhaust line above the water line to relieve pressure when a vacuum is not being created as further described hereinafter.

Figure 14:
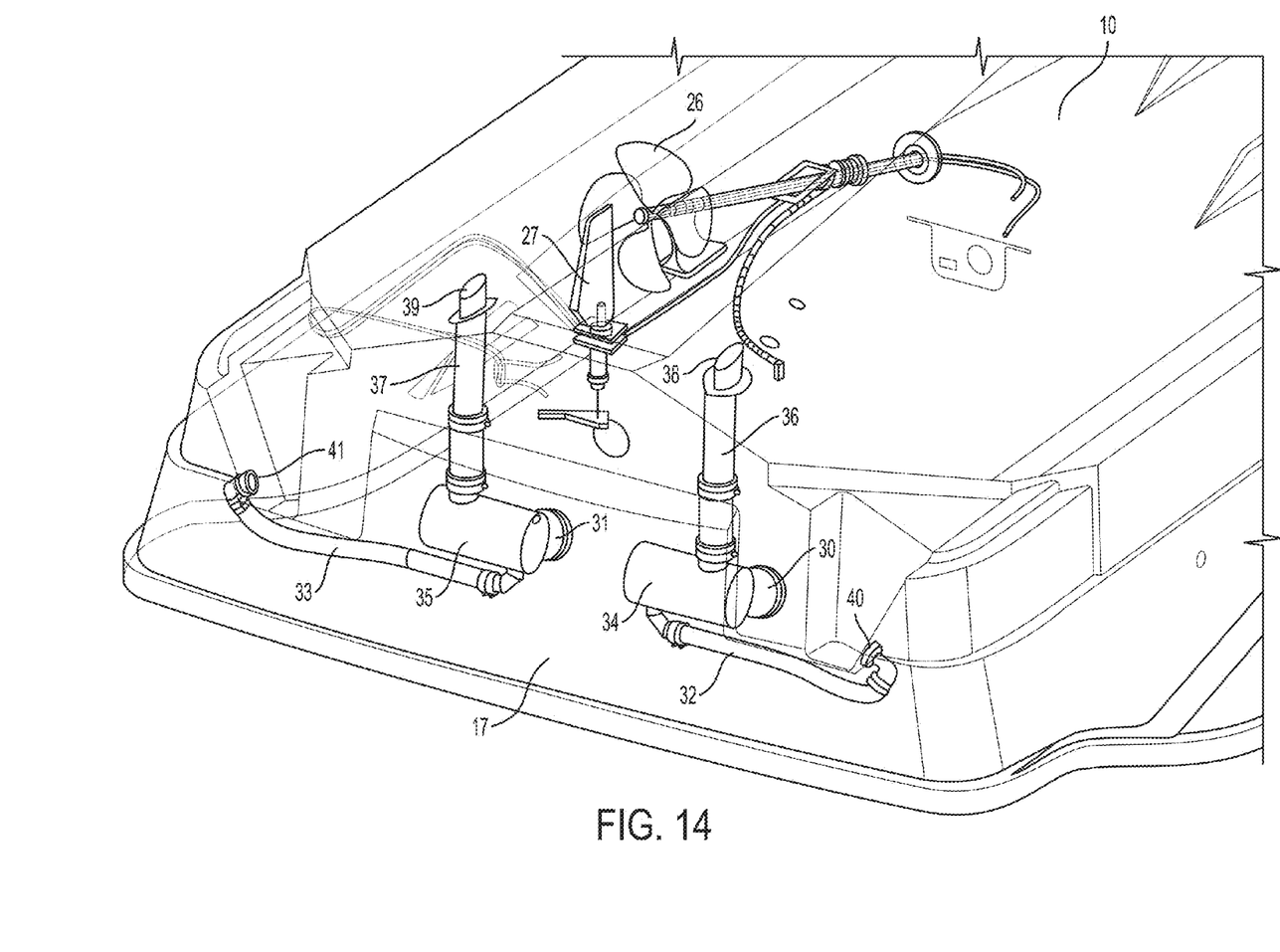
FIG. 14 is a partial perspective bottom plan view of the novel underwater exhaust system.

FIG. 14 is a partial perspective bottom plan view of the novel underwater exhaust system. With reference to FIG. 13 and FIG. 14, the exhaust system includes underwater exhaust outlets 38 and 39, first exhaust lines 36 and 37, water separation canisters 34 and 35, second exhaust lines 30 and 31, and idle relief exhaust bypass lines 32 and 33. It is understood that exhaust lines can be tubes, pipes, hoses or other means for channeling and directing the flow of exhaust fumes to the desired outlets. The design of this underwater exhaust system clears the transom area and reduces the amount of exposed hardware and conventional systems. As shown in conjunction with the wake control system, the underwater exhaust system is complementary, and releases exhaust fumes underneath the hull to ensure that the fumes are entrapped in the passing water rather than ingested by end-users taking part in water sports behind the boat. This design eliminates cumbersome external tubing and other assemblies of conventional designs. The instant system also eliminates vibration at certain speeds when exhaust pressure creates bubbles and turbulence underneath the boat. Vibration and other deleterious effects are mitigated as this system is designed to create a low pressure area underneath the hull when the boat runs at higher speeds. This low-pressure region draws exhaust gases away from the hull and into the surrounding water. At lower speeds this dynamic effect does not occur, which would otherwise allow pressure to build up until it forces its way out beneath the hull and would cause harsh noise and vibration. However, the instant novel exhaust system incorporates the idle relief by-passes on both the port and starboard sides of the vessel above the water line as shown in FIGS. 13 and 14. When the vessel is not moving fast enough to develop a low-pressure region near the underwater outlets 38 and 39, the idle relief exhaust by-passes 32 and 33, and associated outlets 40 and 41 through the hull above the waterline, become the path of least resistance. This allows exhaust gases to escape above the water line eliminating rumbling and vibration when the boat is not moving or moving very slowly. As speeds increase, the underwater outlets create a low-pressure region causing the underwater route to become the path of least resistance and drawing exhaust fumes out underwater.

Figure 15:
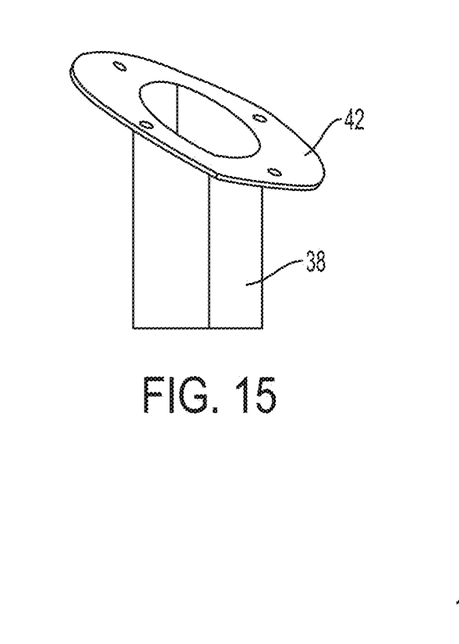
FIG. 15 is a side view of the underwater exhaust outlet hardware.

FIG. 15 is a side view of the underwater exhaust outlet hardware, including angled flange 42 and extended leg section of outlet 38. As shown in the Figures, and particularly FIG. 14, the exhaust outlets have the angled flange to match the angled surface of the hull and are secured thereto, and are attached to the exhaust lines. They also include the extended leg section which protrudes from the flange into the water beneath the hull.

Figure 16:
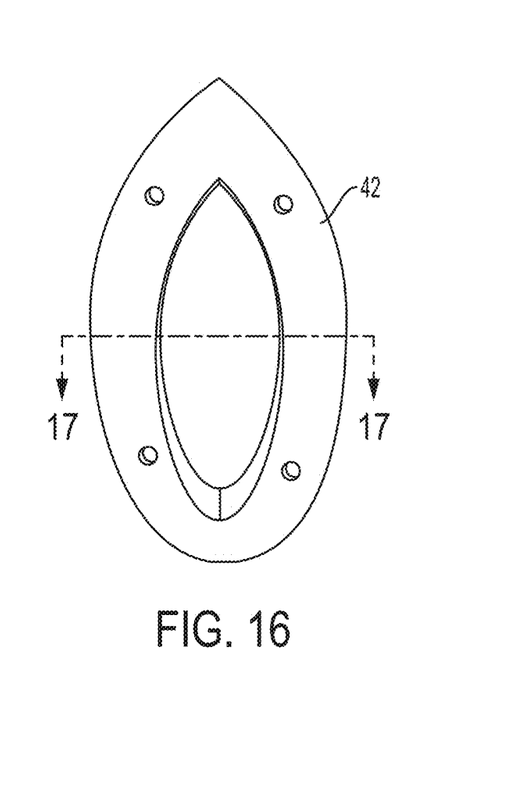
FIG. 16 is a top plan view of the apparatus shown in FIG. 15.

FIG. 16 is a top plan view of the exhaust outlet shown in FIG. 15.

Figure 17:
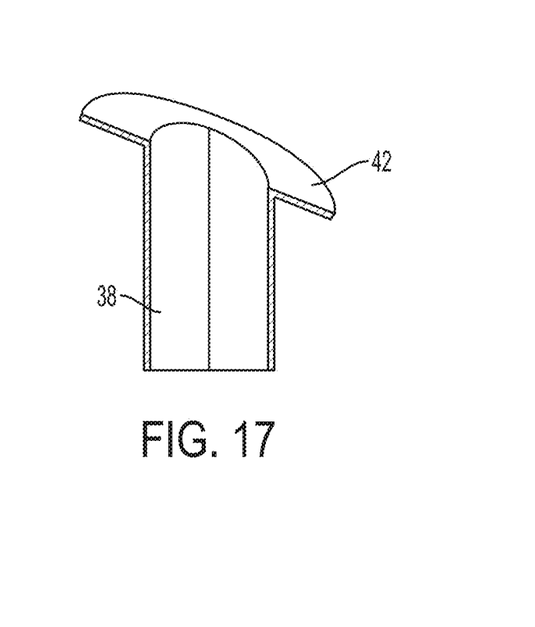
FIG. 17 is cross-sectional view of the apparatus shown in FIG. 16 taken along line 17/17.

FIG. 17 is cross-sectional view of the exhaust outlet shown in FIG. 16 taken along line 17/17.

Figure 18:
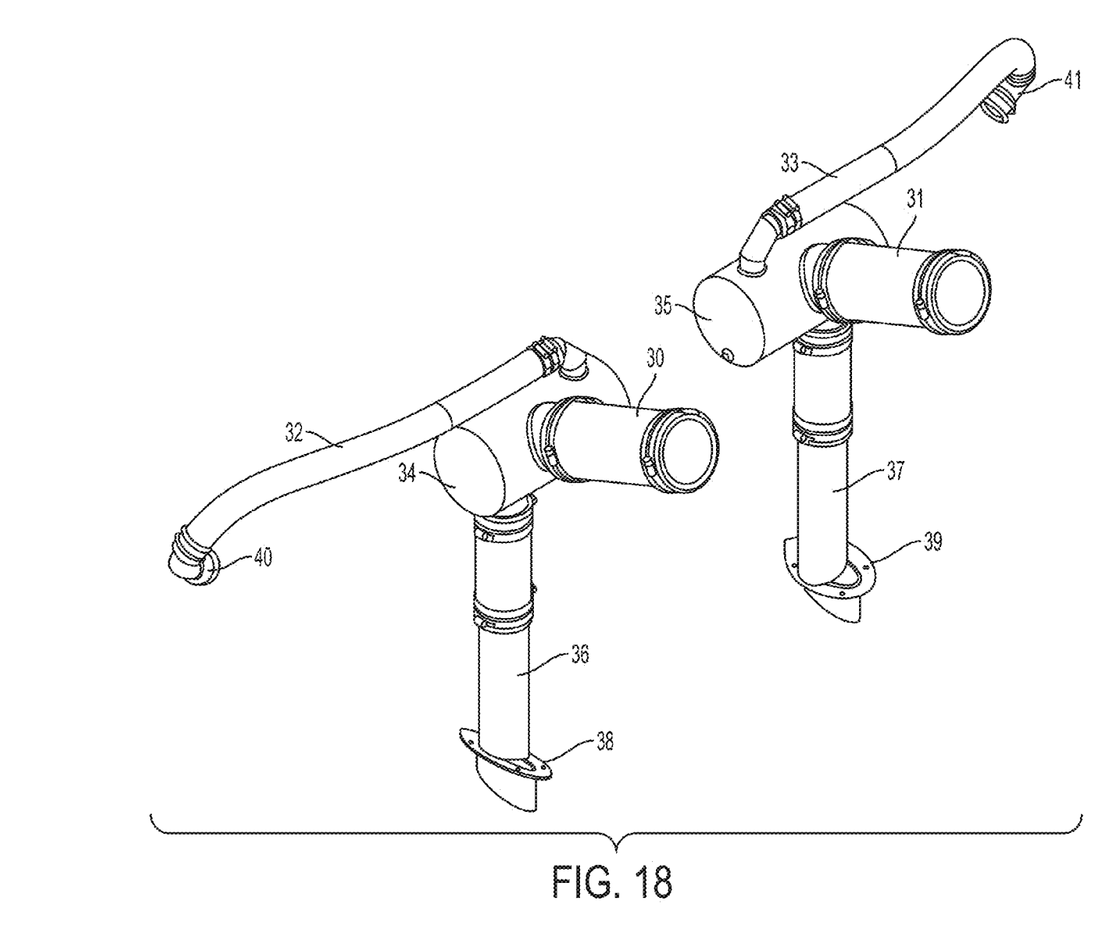
FIG. 18 is a perspective view of the components of the underwater exhaust system.

FIG. 18 is a perspective view of the components of the underwater exhaust system described with reference to FIGS. 13 and 14 prior to installation in the vessel.

Figure 19:
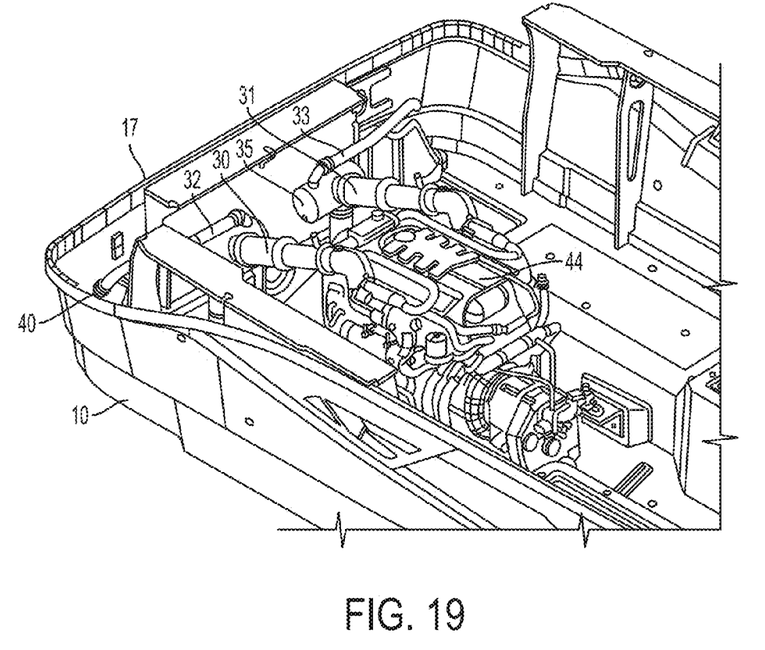
FIG. 19 is a partial perspective view of the underwater exhaust system installed in a marine vessel.

FIG. 19 is a partial top perspective view of the underwater exhaust system installed in a marine vessel including the motor 44.

Figure 20:
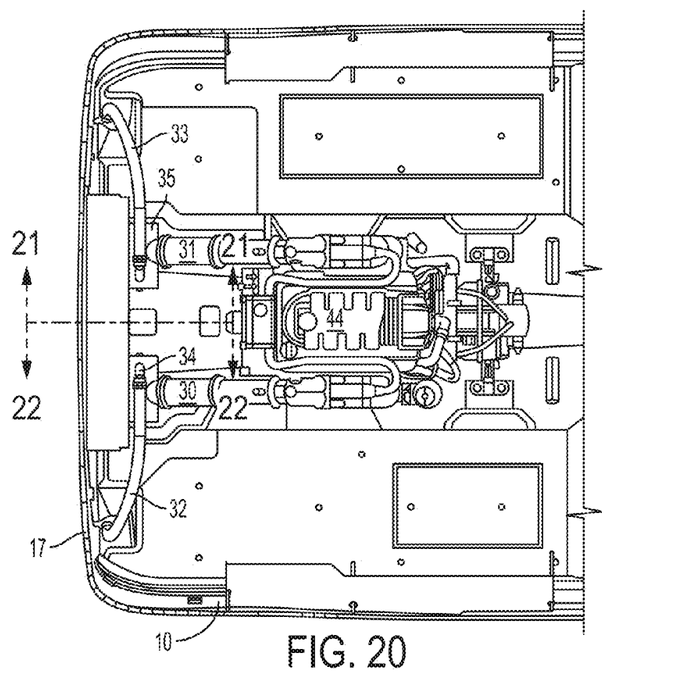
FIG. 20 is a top plan view of the apparatus shown in FIG. 19.

FIG. 20 is a top plan view of the hull section, exhaust system and motor shown in FIG. 19.

Figure 21:
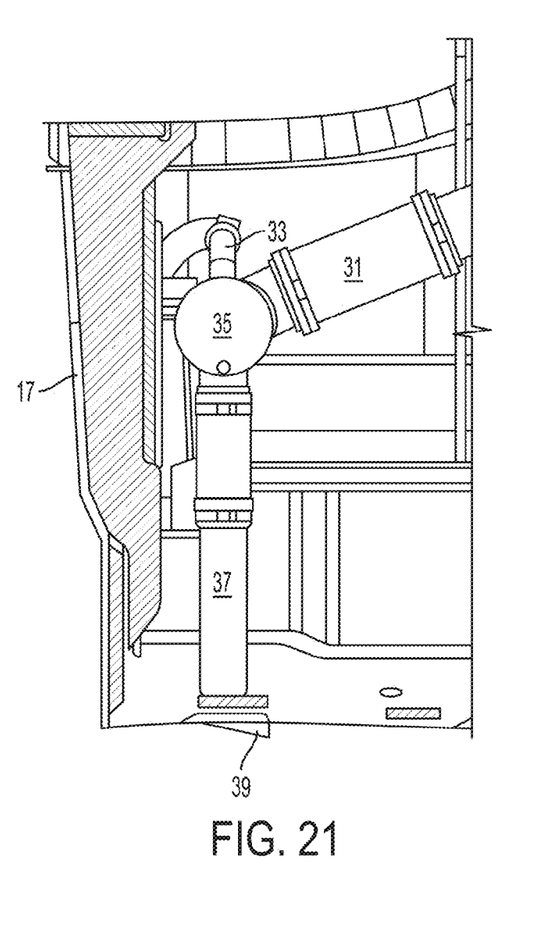
FIG. 21 is a cross-sectional view taken along line 21/21 of FIG. 20.

FIG. 21 is a cross-sectional side view taken along line 21/21 of FIG. 20, illustrating an embodiment of port side components of the exhaust system as described with reference to FIGS. 13 and 14.

Figure 22:
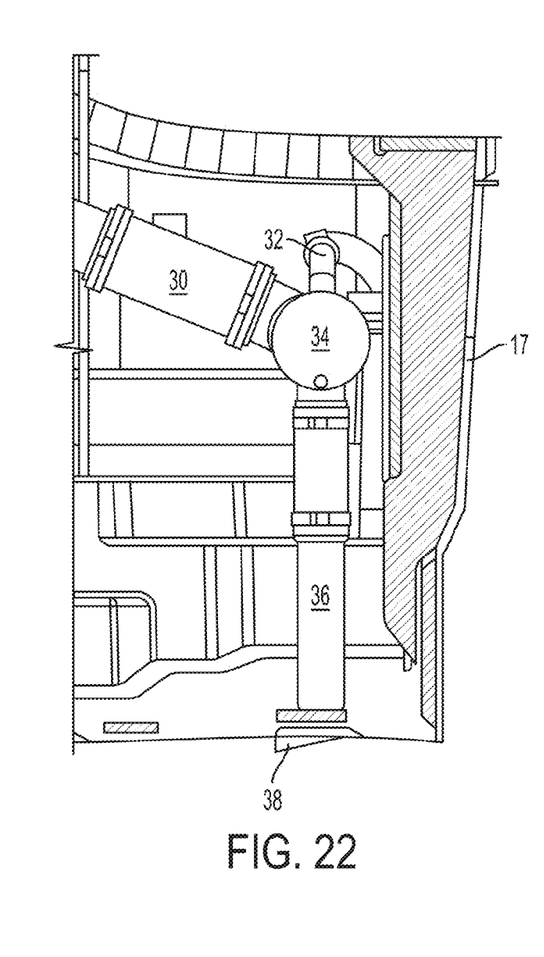
FIG. 22 is a cross-sectional view taken along line 22/22 of FIG. 20.

FIG. 22 is a cross-sectional side view taken along line 22/22 of FIG. 20, illustrating an embodiment of starboard side components of the exhaust system as described with reference to FIGS. 13 and 14.

As noted, the present wake control system and underwater exhaust system encompasses several embodiments that can be fitted to a vessel of any size, weight, or configuration. The size and dimensions of the given components can be adjusted depending on desired performance characteristics and the overall specifications of the given application. Accordingly, the instant invention has been shown and described herein in what is considered to be the most practical and preferred embodiments. It is recognized, however, that departures may be made therefrom within the scope of the invention and that obvious modifications will occur to a person skilled in the art.

The invention claimed is:

1. A wake control system for a marine vessel, comprising:
   at least one fin slidingly engaged on a hull of said vessel having a centerline;
   wherein said at least one fin is transversely adjustable across at least a portion of said hull;
   said fin displaced laterally and maintaining a generally parallel orientation to said vessel centerline when transversely adjustable in operation for altering wake control; and
   wherein said at least one fin is adapted to redirect a wake generated by said marine vessel.

2. The wake control system of claim 1, wherein said fin is slidingly engaged with a fin base, said fin base disposed on said hull of said marine vessel, located substantially at or near the transom thereof.

3. The wake control system of claim 1, wherein said vessel includes a drive shaft, propeller and rudder; and
   said fin is disposed aft of said rudder generally oriented about a centerline of said hull of said vessel.

4. The wake control system of claim 1, further comprising:
   bi-lateral trim tabs.

5. The wake control system of claim 2, wherein said fin is engaged with a track on said fin base.

6. The wake control system of claim 1, wherein adjustability of said fin is remotely actuated.

7. A wake control system for a marine vessel, comprising:
   a starboard fin tab adjacent to a port fin tab, each of said fin tabs hingeably attached to the aft of a hull of said marine vessel;
   each of said fin tabs including at least one fin extending therefrom;
   said vessel including a drive shaft, propeller and rudder;
   said starboard and port fin tabs are disposed aft of said rudder generally oriented in proximity about a centerline of said hull of said vessel; and
   wherein each of said fin tabs are selectively deployable to redirect a wake generated by said marine vessel.

8. The wake control system of claim 7, further comprising:
   said vessel including bi-lateral trim tabs.

9. The wake control system of claim 7, wherein each said starboard and port fin tab is engaged with an actuator attached between a top surface of said fin tab and a transom of said vessel.

10. The wake control system of claim 9, wherein deployability of said fin tabs is remotely actuated.

11. The wake control system of claim 9, wherein when said port side fin tab is deployed and said starboard side fin tab is retracted, said wake control system creates an enhanced wake at the port side of said vessel.

12. The wake control system of claim 9, wherein when said port side fin tab is retracted and said starboard side fin tab is deployed, said wake control system creates an enhanced wake at the starboard side of said vessel.

13. A marine vessel having a wake control system, comprising:
a hull, a driveshaft, propeller, and a rudder aft of said propeller;
said wake control system disposed aft of said rudder, comprising a fin base and at least one fin slidingly engaged with said fin base;
wherein said at least one fin is transversely adjustable along said fin base;
said fin displaced laterally and maintaining a generally parallel orientation to said vessel centerline when transversely adjustable; and
wherein said at least one fin is adapted to redirect a wake generated by said marine vessel.

14. A marine vessel having a wake control system, comprising:
a hull, a driveshaft, propeller, and a rudder aft of said propeller;
said wake control system disposed aft of said rudder, said system comprising a starboard fin tab adjacent to a port fin tab, each of said fin tabs hingeably attached to the aft section of said hull of said marine vessel;
each of said starboard and port fin tabs including at least one fin extending therefrom;
said starboard and port fin tabs generally oriented in proximity about a centerline of said hull of said vessel; and
wherein each of said fin tabs are selectively deployable to redirect a wake generated by said marine vessel.

15. An underwater exhaust system for a marine vessel, comprising:
a hull, inboard motor, and transom;
at least one underwater exhaust outlet, said exhaust outlet secured to the bottom of said hull;
at least one first exhaust line;
at least one water separation canister;
said first exhaust line interposed said exhaust outlet and said water separation canister;
at least one second exhaust line, said second exhaust line interposed said water separation canister and said inboard motor for receiving exhaust fumes;
at least one relief exhaust by-pass line;
at least one relief exhaust outlet, said relief exhaust outlet secured to the hull of said vessel above the water line;
said relief exhaust by-pass line interposed said water separation canister and said relief exhaust outlet;
whereby, when said vessel is traveling at low speed or idle, exhaust fumes flow through said relief exhaust by-pass line and relief exhaust outlet above the water line; and
whereby, when said vessel is traveling at higher speeds, a low pressure area is created at said underwater exhaust outlet and exhaust fumes are then directed therethrough underwater.

16. The underwater exhaust system for a marine vessel of claim 15, further comprising:
port and starboard side underwater exhaust outlets;
port and starboard side first exhaust lines;
port and starboard side water separation canisters;
port and starboard side second exhaust lines;
port and starboard side relief exhaust by-pass lines;
port and starboard side relief exhaust outlets; and
whereby, said underwater exhaust system includes symmetrical components about said port and starboard areas of said marine vessel.

17. The underwater exhaust system for a marine vessel of claim 16, further comprising:
said marine vessel including a wake control system;
said wake control system including at least one fin slidingly engaged on said hull of said vessel;
wherein said at least one fin is transversely adjustable across at least a portion of said hull;
wherein said at least one fin is adapted to redirect a wake generated by said marine vessel; and
said wake control system is generally centered on said hull between said symmetrical components of said underwater exhaust system.

18. The underwater exhaust system for a marine vessel of claim 16, further comprising:
a wake control system for said marine vessel;
said wake control system including a starboard fin tab adjacent to a port fin tab, each of said fin tabs hingeably attached to the aft of a hull of said marine vessel;
each of said fin tabs including at least one fin extending therefrom;
each of said fin tabs being selectively deployable to redirect a wake generated by said marine vessel; and
said wake control system is generally centered on said hull between said symmetrical components of said underwater exhaust system.

19. The underwater exhaust system for a marine vessel of claim 18, further comprising:
said marine vessel including bi-lateral trim tabs;
said underwater exhaust outlets positioned in-board between said port and starboard fin tabs, and said bi-lateral trim tabs, such that exhaust fumes do not flow in water over or about said fin tabs or said trim tabs and avoid interference therewith.

* * * * *